United States Patent
Shi et al.

(10) Patent No.: US 9,635,704 B2
(45) Date of Patent: Apr. 25, 2017

(54) APPARATUS AND METHODS FOR DECOUPLING AN UPLINK ENHANCED DEDICATED CHANNEL AND HIGH SPEED DOWNLINK SHARED CHANNEL

(71) Applicant: Telefonaktiebolaget L M Ericsson (publ), Stockholm (SE)

(72) Inventors: Nianshan Shi, Järfälla (SE); Helena Ihrfors, Spånga (SE); Niilo Musikka, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 37 days.

(21) Appl. No.: 14/772,195

(22) PCT Filed: Mar. 20, 2015

(86) PCT No.: PCT/SE2015/050332
§ 371 (c)(1),
(2) Date: Sep. 2, 2015

(87) PCT Pub. No.: WO2015/142276
PCT Pub. Date: Sep. 24, 2015

(65) Prior Publication Data
US 2016/0128132 A1    May 5, 2016

Related U.S. Application Data

(60) Provisional application No. 61/968,845, filed on Mar. 21, 2014.

(51) Int. Cl.
*H04W 4/00*        (2009.01)
*H04W 76/06*       (2009.01)
*H04W 76/02*       (2009.01)
*H04W 76/04*       (2009.01)
*H04W 88/08*       (2009.01)

(52) U.S. Cl.
CPC ......... *H04W 76/06* (2013.01); *H04W 76/027* (2013.01); *H04W 76/045* (2013.01); *H04W 76/04* (2013.01); *H04W 88/08* (2013.01)

(58) Field of Classification Search
CPC . H04W 76/06; H04W 76/045; H04W 76/027; H04W 88/08; H04W 76/04
See application file for complete search history.

(56) References Cited

PUBLICATIONS

PCT International Search Report for International Application No. PCT/SE2015/050332, Jul. 17, 2015.
3GPP TSG RAN WG1 Meeting #74 bis; Guangzhou, China; Source: ZTE; Title: Further Consideration for E-DCH Decoupling in UMTS HetNet (R1-134669), Oct. 7-Nov. 2013
(Continued)

*Primary Examiner* — Afshawn Towfighi
(74) *Attorney, Agent, or Firm* — Baker Botts, LLP

(57) ABSTRACT

A method in a network node for decoupling an uplink enhanced dedicated channel, E-DCH, and a high speed downlink shared channel, HS-DSCH, comprises determining whether a radio link message contains a E-DCH decoupling indication (step 201). Where it is determined that the radio link message does not contain an E-DCH decoupling indication, the method comprises controlling a base station node to reject a radio link procedure in the event that a serving E-DCH radio link and a serving HS-DSCH radio link are not configured in the same cell (step 203).

21 Claims, 9 Drawing Sheets

(56) References Cited

PUBLICATIONS

3GPP TSG RAN WG3 Meeting #83bis; Los Cabos, Mexico; Source: Ericsson; Title: E-DCH decoupling for Rel-12 terminals in UMTS Heterogeneous Networks enhancements Work Item (R3-140828), Mar. 31-Apr. 4, 2014.
3GPP TR 25.800 V12.1.0; Technical Report; 3rd Generation Partnership Project; Technical Specification Group Radio Access Network; Study on UMTS heterogeneous networks (Release 12), Dec. 2013.
3GPP TS 25.433 V12.0.0; Technical Specification; 3rd Generation Partnership Project; Technical Specification Group Radio Access Network; UTRAN lub interface Node B Application Part (NBAP) signalling (Release 12), Dec. 2013.
3GPP TS 25.423 V12.0.0; Technical Specification; 3rd Generation Partnership Project; Technical Specification Group Radio Access Network; UTRAN lur interface Radio Network Subsystem Application Part (RNSAP) signalling (Release 12), Dec. 2013.
3GPP TSG-RAN WG3 Meeting #83bis; San Jose Del Cabo, Mexico; Title: E-DCH decoupling in HetNET; Change Request (R3-140621), Mar. 31-Apr. 4, 2014.

APPARATUS AND METHODS FOR DECOUPLING AN UPLINK ENHANCED DEDICATED CHANNEL AND HIGH SPEED DOWNLINK SHARED CHANNEL

PRIORITY

This nonprovisional application is a U.S. National Stage Filing under 35 U.S.C. §371 of International Patent Application Serial No. PCT/SE2015/050332 filed Mar. 20, 2015, and entitled "APPARATUS AND METHODS FOR DECOUPLING AN UPLINK ENHANCED DEDICATED CHANNEL AND HIGH SPEED DOWNLINK SHARED CHANNEL" which claims priority to U.S. Provisional Patent Application No. 61/968,845 filed Mar. 21, 2014, both of which are hereby incorporated by reference in their entirety.

TECHNICAL FIELD

Embodiments described herein relate generally to wireless communications, and more particularly to apparatus and methods for decoupling an uplink enhanced dedicated channel and a high speed downlink shared channel.

BACKGROUND

Certain standards provide specifications for cellular telecommunications network technologies, including radio access, the core transport network, and service capabilities. For example, Release 12 of the 3rd Generation Partnership Project (3GPP) provides enhanced support of Heterogeneous Networks for co-channel, dedicated frequency, and multicarrier. One objective is to avoid co-channel interference, for example by specifying solutions to mitigate uplink and downlink imbalance. In view of this, one aspect of the enhanced support is to allow an uplink enhanced dedicated channel (E-DCH) to be decoupled for Rel-12 terminals. E-DCH decoupling in this context is the decoupling of the serving E-DCH cell and the serving high speed downlink shared channel (HS-DSCH) cell from each other. Doing so can improve the performance in the presence of imbalance between the uplink and the downlink, characteristic to the heterogeneous network environment.

In the Radio Link resources handling, the E-DCH and the HS-DSCH may be setup, added, and/or reconfigured separately, using Radio Link Setup, Radio Link Addition and/or Radio Link Reconfiguration procedures and associated radio link messages.

In the current Node B Application Part (NABP) and the Radio Network Subsystem Application Part (RNSAP) specifications, the establishment of an E-DCH on one or more radio links are supported. The Serving E-DCH Radio Link Information Element, "Serving E-DCH RL IE" may be used for example to indicate the Serving E-DCH RL.

However, the existing 3GPP standard (i.e. pre-Release 12 of the 3GPP standard) specifies that, if the serving E-DCH and the serving HS-DSCH are not in the same cell, the node B or the drifting network radio controller (DRNC) should reject the radio link resource handling procedures, and as such do not support a decoupling procedure.

For example, the legacy procedures couple the serving E-DCH and HS-DSCH, as shown from the extract below from 3GPP Technical Specification TS 25.433 (pre Release 12), for example the Abnormal Conditions according to section 8.2.17.4 which relate to a Radio Link Setup Request procedure, and which states:

If the RADIO LINK SETUP REQUEST message contains the HS-PDSCH RL ID IE and the Serving E-DCH RL IE but the Serving HS-DSCH Radio Link and the Serving E-DCH Radio Link are not configured to be in the same cell then the Node B shall reject the procedure using the RADIO LINK SETUP FAILURE message.

Thus, from above it can be seen that the current (Pre Release 12) 3GPP specifications relating to NABP or RNSAP do not permit decoupling, which results in a backwards compatibility problem between a radio network controller (RNC) configured for Release 12 or later, and pre-Release 12 Node Bs and DRNCs.

SUMMARY

It is an aim of the embodiments of the present disclosure to provide a method and apparatus which obviate or reduce at least one or more of the disadvantages mentioned above.

According to a first aspect, there is provided a method in a network node for decoupling an uplink enhanced dedicated channel, E-DCH, and a high speed downlink shared channel, HS-DSCH. The method comprises determining whether a radio link message contains a E-DCH decoupling indication. Where it is determined that the radio link message does not contain an E-DCH decoupling indication, the method comprises controlling a base station node to reject a radio link procedure in the event that a serving E-DCH radio link and a serving HS-DSCH radio link are not configured in the same cell.

According to another aspect, there is provided a radio network node for decoupling an uplink enhanced dedicated channel, E-DCH, and a high speed downlink shared channel, HS-DSCH. The radio network node comprises a network interface adapted to interface with a radio network, a memory unit and a processor unit. The processor unit is adapted to run program instructions stored on the memory unit. The processor unit is adapted to determine whether a radio link message received from a radio network controller, RNC, contains an indication that a radio link procedure has the capability of decoupling an E-DCH and a HS-DSCH. Where it is determined that the radio link message does not contain an E-DCH indication, the processor unit is further adapted to reject the radio link procedure in the event that a serving E-DCH radio link and a serving HS-DSCH radio link are not configured in the same cell.

According to another aspect, there is provided a radio network controller, RNC, node for decoupling an uplink enhanced dedicated channel, E-DCH, and a high speed downlink shared channel, HS-DSCH. The radio network controller node comprises a network interface adapted to interface with a radio network, a memory unit and a processor unit. The processor unit is adapted to run program instructions stored on the memory unit. The processor unit is adapted to determine whether a received radio link message contains a E-DCH decoupling indication, indicating that a base station node supports decoupling of an E-DCH and a high speed downlink shared channel, HS-DSCH. Where it is determined that the E-DCH decoupling indication has not been received, the processor unit is further adapted to control the base station node to reject the radio link procedure in the event that a serving E-DCH radio link and a serving HS-DSCH radio link are not configured in the same cell.

According to another aspect, there is provided a method comprising the steps of inserting an information element into a radio link message, the information element comprising an indication that an uplink enhanced dedicated channel, E-DCH, may be decoupled from a high speed downlink shared channel, HS-DSCH.

Some embodiments propose solutions to solve the backwards not compatible problem caused by decoupling an uplink enhanced dedicated channel (E-DCH) cell and a high speed downlink shared channel (HS-DSCH) cell from each other. In one example embodiment, the method may include:

Determining whether an RNC has received an indication stating that a Node B or DRNC supports EDCH decoupling;

Applying pre Rel-12 Abnormal Conditions, where it is determined that the indication has not been received from the Node B or DRNC; and Not applying pre Rel-12 Abnormal Conditions, where it is determined that the indication has been received from the Node B or DRNC.

Optionally, the indication from Node B may be set on Cell bases and be included in Audit and Resource Status Indication procedure.

Optionally, the indication from Node B may be added to an existing Node B Cell Capability Container, which is sent in AUDIT.

In another example embodiment, the method may include:

Determining whether an RNC has transmitted a message to the Node B or DRNC indicating that the radio link is setup with decoupled E-DCH and the Node B or DRNC has accepted to support E-DCH decoupling;

Applying pre Rel-12 Abnormal Conditions, where it is determined that the RNC has not transmitted the message to the Node B or DRNC indicating that the radio link is setup with decoupled E-DCH and/or the Node B or DRNC has not accepted to support E-DCH decoupling; and Not applying pre Rel-12 Abnormal Conditions, where it is determined that RNC has transmitted the message and the Node B or DRNC has accepted to support E-DCH decoupling.

In still another example embodiment, the method may include:

Determining whether 1) an RNC has transmitted a message to the Node B or DRNC indicating that the radio link is setup with decoupled E-DCH and 2) the Node B or DRNC has transmitted an indication stating that the Node B or DRNC supports E-DCH decoupling;

Applying pre Rel-12 Abnormal Conditions, where it is determined that the RNC has not transmitted the message to the Node B or DRNC and that the Node B or DRNC has not transmitted the message indicating that it supports E-DCH decoupling; and Not applying pre Rel-12 Abnormal Conditions, where it is determined that the RNC has transmitted the message to the Node B or DRNC and that the Node B or DRNC has transmitted the message indicating that it supports E-DCH decoupling.

Other implementations may include a wireless communication device and/or access node configured to implement the described method, or a wireless communication system in which a wireless communication device and/or access node implement the described method.

Some embodiments of the disclosure may provide one or more technical advantages. For example, in certain embodiments, decoupling of the serving E-DCH cell and the serving HS-DSCH cell may be allowed for the improved performance in the presence of imbalance between the uplink and the downlink. Accordingly, a technical advantage may be the decoupling of the serving E-DCH cell and the serving HSDSCH cell in heterogeneous network environments.

Another technical advantage may be that the Node B or DRNC may not reject a particular radio link procedure even where the HS-DSCH and the E-DCH are not in the same cell. Still another advantage may be that the backwards not compatible problem may be alleviated. Some embodiments may benefit from some, none, or all of these advantages. Other technical advantages may be readily ascertained by one of ordinary skill in the art.

BRIEF DESCRIPTION OF DRAWINGS

For a more complete understanding of the present invention and its features and advantages, reference is now made to the following description, taken in conjunction with the accompanying drawings, in which.

DETAILED DESCRIPTION

Particular embodiments are described in FIGS. 1-6 of the drawings, like numerals being used for like and corresponding parts of the various drawings.

Figure 1:
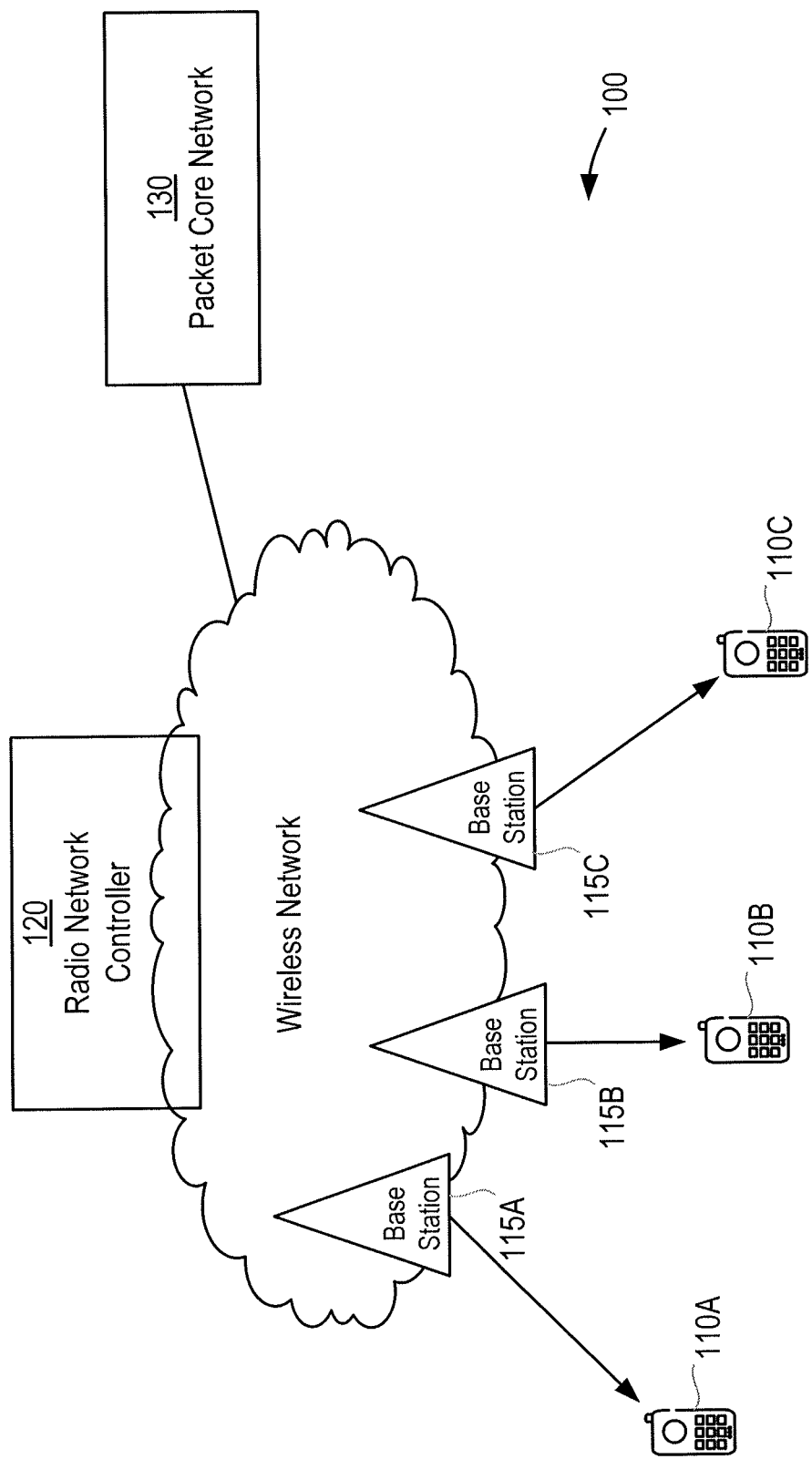
FIG. 1 is a block diagram illustrating an embodiment of a network.

A radio network controller may facilitate a communication session for a wireless device in soft handover with an active set of cells. The active set may include a serving cell and one or more non-serving cells. FIG. 1 is a block diagram illustrating embodiments of a radio network 100 that includes one or more wireless devices 110, radio network nodes 115 (for example base station nodes), radio network controller 120, and core network nodes 130. A wireless device 110 may communicate with a radio network node 115 over a wireless interface. For example, wireless device 110 may transmit wireless signals to radio network node 115 and/or receive wireless signals from radio network node 115. The wireless signals may contain voice traffic, data traffic, control signals, and/or any other suitable information.

Radio network node 115 may interface with radio network controller 120. Radio network controller 120 may control radio network node 115 and may provide certain radio resource management functions, mobility management functions, and/or other suitable functions. Radio network controller 120 may interface with core network node 130. In certain embodiments, radio network controller 120 may interface with core network node 130 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, core network node 130 may manage the establishment of communication sessions and various other functionality for wireless device 110. Wireless device 110 may exchange certain signals with core network node 130 using the non-access stratum layer. In non-access stratum signalling, signals between wireless device 110 and core network node 130 may be transparently passed through the radio access network. Example embodiments of a radio network node 115, and a network node (such as radio network controller 120 or core network node 130) are described later with respect to FIGS. 5 and 6, respectively.

Figure 2A:
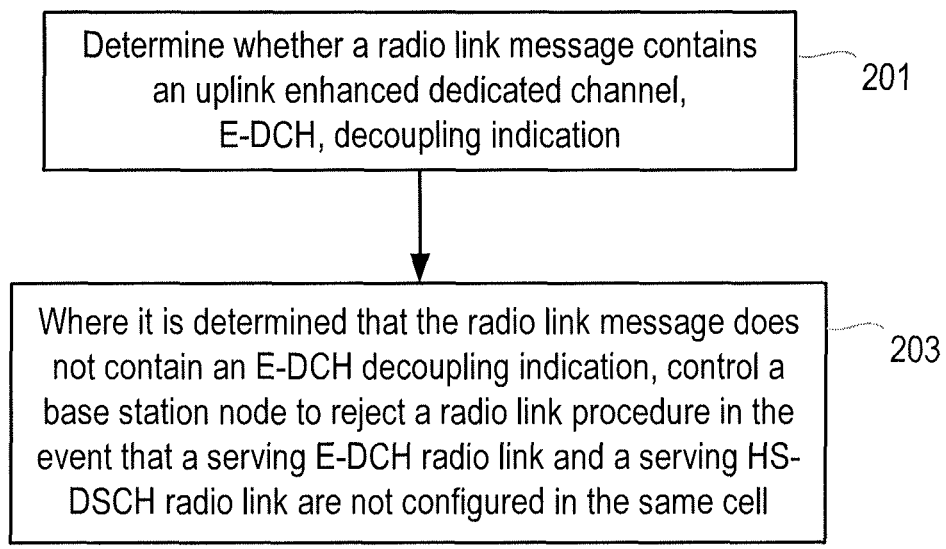
FIG. 2*a* illustrates a method according to an embodiment.

FIG. 2a shows a method, according to one embodiment, in a network node for decoupling an uplink enhanced dedicated channel, E-DCH, and a high speed downlink shared channel, HS-DSCH. The method comprises determining whether a radio link message contains a E-DCH decoupling indication, step 201. Where it is determined that the radio link message does not contain an E-DCH decoupling indication, a base station node is controlled to reject a radio link procedure in the event that a serving E-DCH radio link and a serving HS-DSCH radio link are not configured in the same cell, step 203.

In one example, where it is determined that the radio link message does contain an E-DCH decoupling indication, a base station node is controlled such that it does not reject a radio link procedure in the event that a serving E-DCH radio link and a serving HS-DSCH radio link are not configured in the same cell.

The E-DCH decoupling indication may be provided in an information element, IE, of the radio link message. In one example this may be referred to as an E-DCH Decoupling Indication IE.

In one embodiment the E-DCH decoupling indication may be set on a per cell basis. The E-DCH decoupling indication may be included, for example, in an audit and resource status indication procedure, for example as defined in the third generation partnership project, 3GPP, Technical Specification TS 25.433 (e.g. v.12.0.0 or later), sections 8.2.7 and 8.2.15, respectively. In one example the E-DCH decoupling indication may be added to a cell capability container, for example an existing cell capability container.

The base station node may comprise, for example, a Node B or a drifting radio network controller, DRNC, node.

According to some embodiments a radio link procedure may comprise a radio link setup request procedure, a radio link addition request procedure, a radio link reconfiguration prepare procedure or a radio link reconfiguration request procedure.

According to some embodiments a radio link message may comprise a radio link setup request message, a radio link addition request message, a radio link reconfiguration prepare message or a radio link reconfiguration request message.

The method may comprises performing abnormal conditions relating to one or more of sections 8.2.17.4 or 8.3.1.4 or 8.3.2.4 or 8.3.5.4 of the third generation partnership project, 3GPP, Technical Specification TS 25.433 version 12.0.0 or later.

In one embodiment, at least part of the method may be performed in a network node comprising a radio network controller, RNC, node. In such an embodiment the E-DCH decoupling indication may be received from a base station node, i.e. a base station node which is to be controlled.

In one embodiment, at least part of the method may be performed in a network node comprising a base station node, for example a Node B or DRNC. In such an embodiment, the E-DCH decoupling indication may be received from a radio network controller, RNC node.

In one example the base station node may perform the step of deciding whether or not to support E-DCH decoupling. The step of deciding whether or not to support E-DCH decoupling may be based on one or more of: whether the base station node is capable of supporting decoupling of an E-DCH and a HS-DSCH; whether the base station node is capable of supporting decoupling of an E-DCH and a HS-DSCH, and if so, whether the base station node wishes to provide decoupling for that particular radio link based on some other criteria; whether the base station node is capable of supporting decoupling of an E-DCH and a HS-DSCH, and if so, whether the base station node has capacity to support E-DCH decoupling.

Figure 2B:
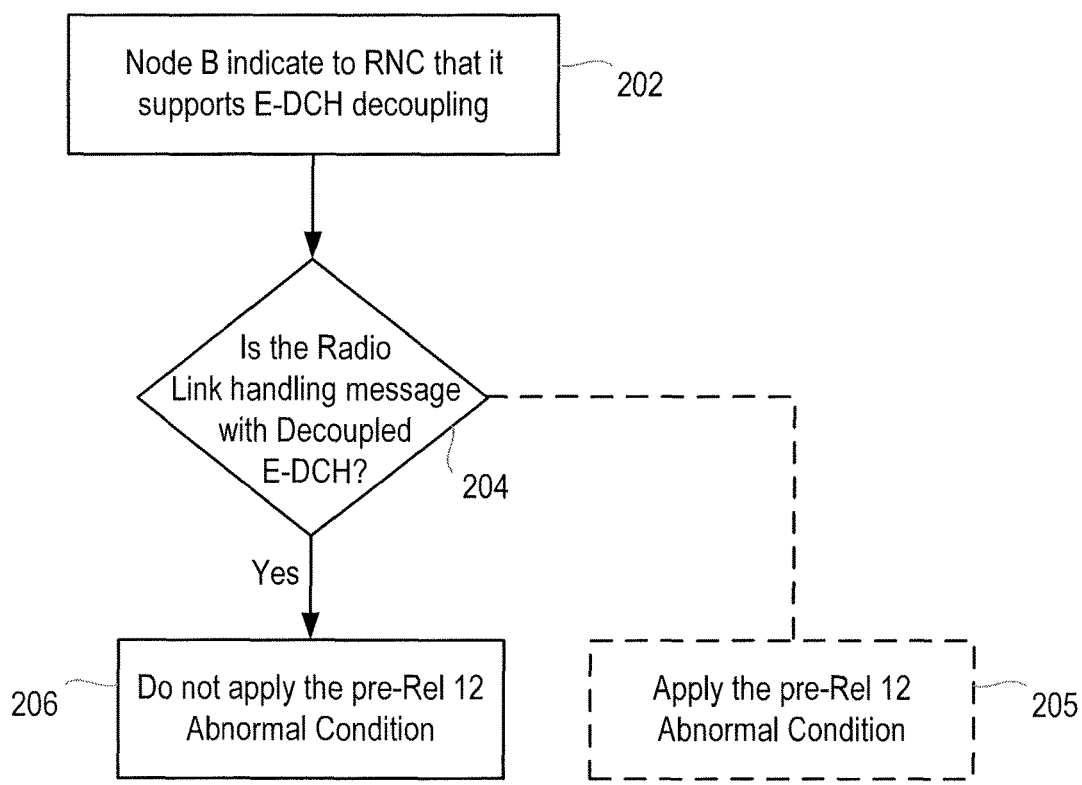
FIG. 2*b* illustrates a method according to another embodiment.

FIG. 2b illustrates a method according to another embodiment, for decoupling an uplink enhanced dedicated channel (E-DCH) cell and a high speed downlink shared channel (HS-DSCH) cell that solves the backwards not compatible problem. At step 202, a network node, for example a base station node, such as a Node B or DRNC, indicates to a Radio Network Controller (RNC) that it can handle the E-DCH decoupling. According to this embodiment, the RNC is configured such that it may only setup the decoupled E-DCH towards this type of Node B or DRNC, e.g. towards a base station node which has indicated in this manner that it supports decoupling of the E-DCH.

According to one embodiment, an explicit indication is sent from a Node B or DRNC to a RNC to state that it supports the decoupled E-DCH. This indication may be set on a per cell basis, for example whereby each cell reports its capability separately, e.g. on a cell-by-cell basis. The indication may be included in Audit and Resource Status indication procedures in certain embodiments. For example, such an indication may be added to an existing Node B Cell Capability Container, which is sent in AUDIT. At step 204, it is determined whether the radio link handling message from the Node B indicates that it supports E-DCH decoupling. In particular embodiments, the Abnormal Conditions in specifications relating to the Node B Application Part (NBAP) or the Radio Network Subsystem Application Part (RNSAP) in Radio Link Setup, Radio Link Addition, Radio Link Reconfiguration procedures may be modified to state that, if the Node B does not indicate the E-DCH decoupling, then the existing abnormal condition is valid.

Table 1 below is an extract from Technical Specification TS 25.433 (v. 12.0.0), 8.2.17.4 Abnormal Conditions. The text shown in bold demonstrates alternative language according to one embodiment, for realising the procedure described above for FIG. 2a or 2b:

TABLE 1

| | Current Text | Modified Text Example |
|---|---|---|
| 8.2.17.4 Abnormal Conditions | If the RADIO LINK SETUP REQUEST message contains the HS-PDSCH RL ID IE and the Serving E-DCH RL IE but the Serving HS-DSCH Radio Link and the Serving E-DCH Radio Link are not configured to be in the same cell then the Node B | If the Node B does not indicate "E-DCH decoupling Capable", and if the RADIO LINK SETUP REQUEST message contains the HS-PDSCH RL ID IE and the Serving E-DCH RL IE but the Serving HS-DSCH Radio Link and the Serving E-DCH Radio Link are not configured to be |

TABLE 1-continued

| Current Text | Modified Text Example |
|---|---|
| shall reject the procedure using the RADIO LINK SETUP FAILURE message. | in the same cell then the Node B shall reject the procedure using the RADIO LINK SETUP FAILURE message. |

As can be seen from TABLE 1, according to pre-Rel 12 abnormal conditions, if a Radio Link Setup Request message contains a High Speed Physical Downlink Shared Channel Radio Link Identifier Information Element (HS-PDSCH RL ID IE) and the serving Enhanced Uplink Dedicated Channel Radio Link Information Element (E-DCH RL IE), but the serving HS-DSCH radio link and the serving E-DCH radio link are not configured to be in the same cell, then the Node B shall reject the procedure using the radio link setup failure message.

In this example, a new information element, IE, is introduced, which as mentioned earlier may be referred to as the "E-DCH decoupling capability" information element, which can be set to "E-DCH decoupling Capable" and "E-DCH decoupling Not Capable". Thus, where an indication has not been received indicating that it supports E-DCH decoupling, the pre-Release 12 Abnormal Conditions may be applied (shown as step 205).

Conversely, if RNC determines that it has received such a notification from Node B, the pre-Rel 12 Abnormal Conditions are not applied at a step 206. This embodiment allows the E-DCH decoupling in a very general way. The change allows not only the decoupling for macro and low power node (Macro—LPN) deployment, but also any other legacy deployment, according to certain embodiments.

Figure 2C:
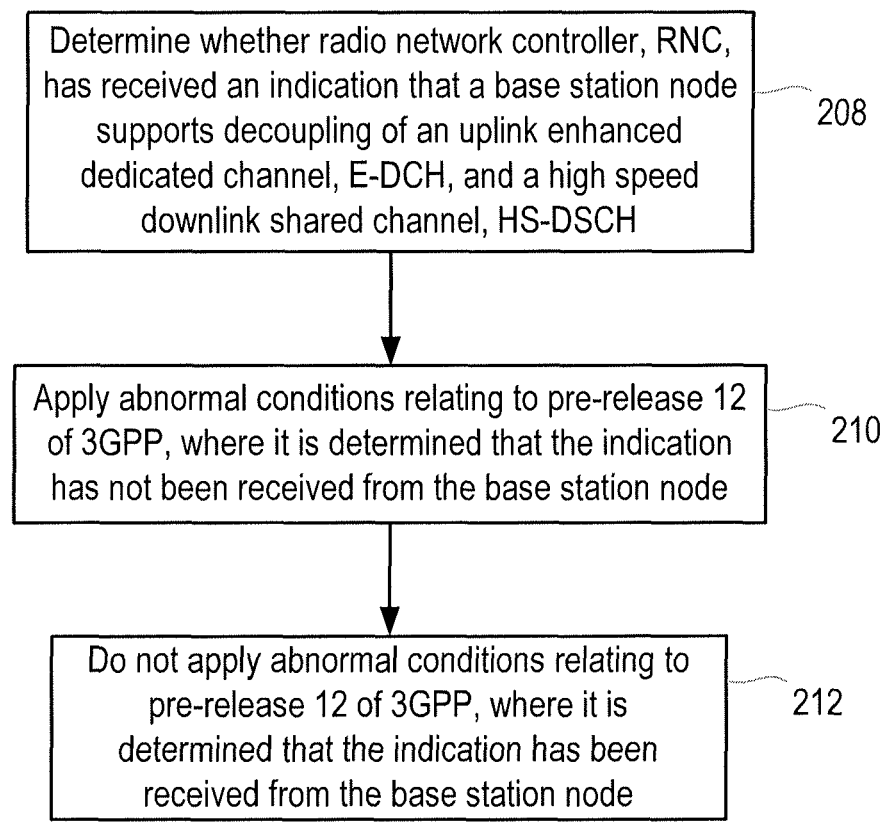
FIG. 2*c* illustrates a method according to another embodiment.

FIG. 2c shows a method in a network node according to another embodiment, for decoupling an uplink enhanced dedicated channel, E-DCH, and a high speed downlink shared channel, HS-DSCH. The method comprises determining whether a radio network controller, RNC, has received an indication stating that a base station node supports decoupling an E-DCH and a HS-DSCH, step 208. Where it is determined that an indication has not been received from the base station, the method comprises applying abnormal conditions relating to pre-release 12 of 3GPP, i.e. applying pre Rel-12 Abnormal Conditions, step 210. Where it is determined that an indication has been received from the base station, the method comprises not applying abnormal conditions relating to pre-release 12 of 3GPP, i.e. not applying pre Rel-12 Abnormal Conditions, step 212.

In one example, the indication from the base station node is set on a per cell basis. The indication from the base station may be included in an audit and resource status indication procedure.

In one example the indication from the base station may be added to a base station cell capability container, for example an existing cell capability container, which is sent in an audit procedure.

According to certain embodiments, the base station node comprises a Node B or a drifting network radio controller, DRNC, node.

Figure 3A:
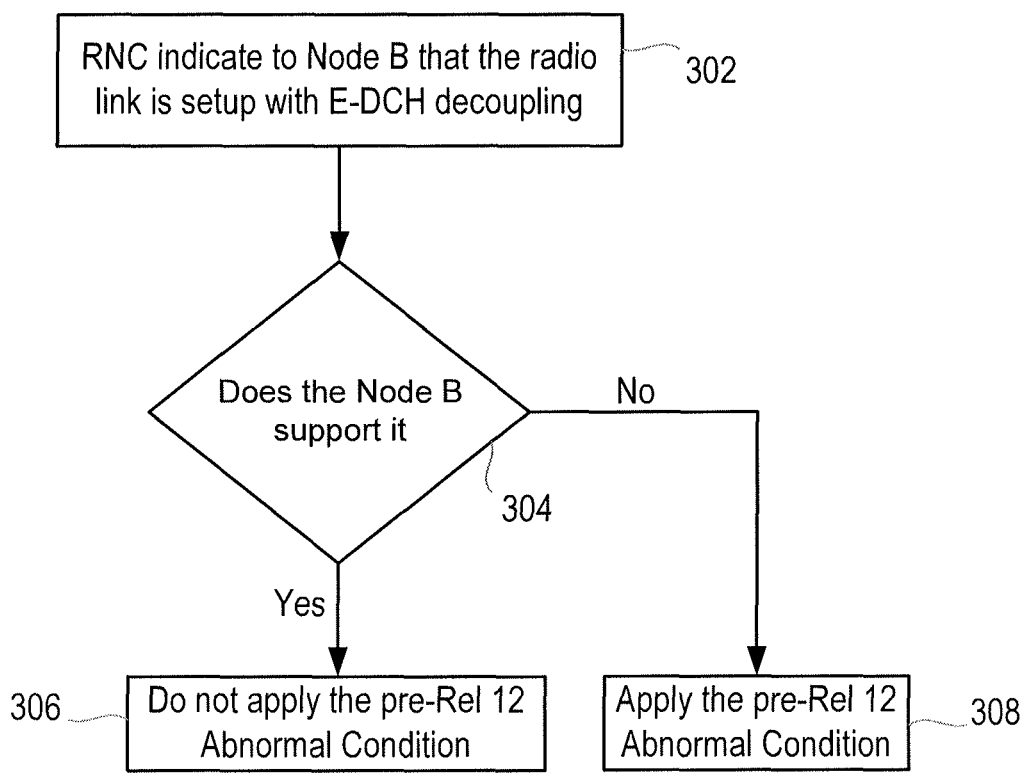
FIG. 3*a* illustrates a method according to another embodiment.

FIG. 3a illustrates an alternative method for decoupling an E-DCH cell and a HS-DSCH cell from each other, in accordance with certain other embodiments. According to the illustrated method, the RNC indicates that the Radio Link is setup with decoupled E-DCH at step 302. Specifically, in one example the EDCH decoupling indication is sent from the RNC to a base station node, for example a Node B or DRNC, to indicate the E-DCH is decoupled from HS-DSCH. For example, such an indication can be added in the dedicated Radio Link messages (for example Radio Link Setup Request, Radio Link Addition Request, Radio Link Reconfiguration Prepare, Radio Link Reconfiguration Request).

For the base station node (e.g. Node B or DRNC) that can support decoupling, and wishes to handle decoupling, the base station node can accept the messages and set up so that the serving E-DCH and the serving HS-DSCH are not necessarily in the same cell. Subsequently, a determination can be made at step 304 that the Node B or DRNC has accepted the message, and that the pre-Rel 12 Abnormal Condition will not be applied at step 306. As such, when a base station node is capable of supporting decoupling (and wishes to use decoupling for that particular radio link setup, for example based on some form of predetermined criteria), then the base station node may allow the E-DCH and HS-DSCH to be decoupled.

In particular embodiments, the Abnormal Conditions in NBAP/RNSAP specifications in Radio Link Setup, Radio Link Addition, Radio Link Reconfiguration procedures may be modified to state if RNC does not indicate E-DCH decoupling, then the existing abnormal condition is valid. Table 2a is an extract from TS 25.433 (v. 12.0.0) 8.2.17.4 Abnormal Conditions and demonstrates proposed alternative language for this type of embodiment:

TABLE 2a

| | Current Text | Modified Text Example |
|---|---|---|
| 8.2.17.4 Abnormal Conditions | If the RADIO LINK SETUP REQUEST message contains the HS-PDSCH RL ID IE and the Serving E-DCH RL IE but the Serving HS-DSCH Radio Link and the Serving E-DCH Radio Link are not configured to be in the same cell then the Node B shall reject the procedure using the RADIO LINK SETUP FAILURE message. | If the RADIO LINK SETUP REQUEST message does not contain E-DCH decoupling Request IE and contains the HS-PDSCH RL ID IE and the Serving E-DCH RL IE but the Serving HS-DSCH Radio Link and the Serving E-DCH Radio Link are not configured to be in the same cell then the Node B shall reject the procedure using the RADIO LINK SETUP FAILURE message. |

In particular embodiments, the Abnormal Conditions in NBAP/RNSAP specification in Radio Link Setup, Radio Link Addition, Radio Link Reconfiguration procedures may be modified to state if RNC does not indicate E-DCH decoupling, then the existing abnormal condition is valid. Table 2b is an extract from TS 25.433 (v. 12.0.0) 8.2.17.4 Abnormal Conditions and demonstrates proposed alternative language for this type of embodiment:

TABLE 2b

| | Current Text | Modified Text Example |
|---|---|---|
| 8.2.17.4 Abnormal Conditions | If the RADIO LINK SETUP REQUEST message contains the HS-PDSCH RL ID IE and the Serving E-DCH RL IE but the Serving HS-DSCH Radio Link and the Serving E-DCH Radio Link are not configured to be in the same cell then the Node B shall reject the procedure using the RADIO LINK | If the RADIO LINK SETUP REQUEST message does not contain the E-DCH Decoupling Indication IE but contains the HS-PDSCH RL ID IE and the Serving E-DCH RL IE, and ~~but~~ the Serving HS-DSCH Radio Link and the Serving E-DCH Radio Link are not configured to be in the same cell then the Node B shall reject the procedure |

TABLE 2b-continued

| Current Text | Modified Text Example |
| --- | --- |
| SETUP FAILURE message. | using the RADIO LINK SETUP FAILURE message. |

This alternative (covered by the examples of Tables 2a and 2b) allows the E-DCH decoupling to be applied on a per user equipment (UE) basis.

Furthermore, a base station node (e.g. Node B) may allow/disallow the E-DCH decoupling on a case by case basis (i.e. from one radio link setup to another radio link setup, or from one radio link addition to another, or from one radio link reconfiguration to another), for example based on some predetermined criteria. The criteria may include, for example, a scenario where a base station node has a missing capability, or a resource shortage, or a hardware failure. Other criteria may also be used.

Such embodiments provide both flexibility in the radio network controller and in the base station node. For a Node B or DRNC that did not accept the message of step 302 (or does not support decoupling), the abnormal conditions according to the current specification can be applied (i.e. the pre-Rel 12 Abnormal Conditions applied, as shown in step 308), and hence the decoupling procedure will be rejected. In particular embodiments, a failure cause can be introduced to the NBAP/RNSAP specification such that when a Node B or DRNC rejects the procedure due to not supporting or not allowing E-DCH decoupling, the cause value is sent to the RNC in the failure message.

Figure 3B:
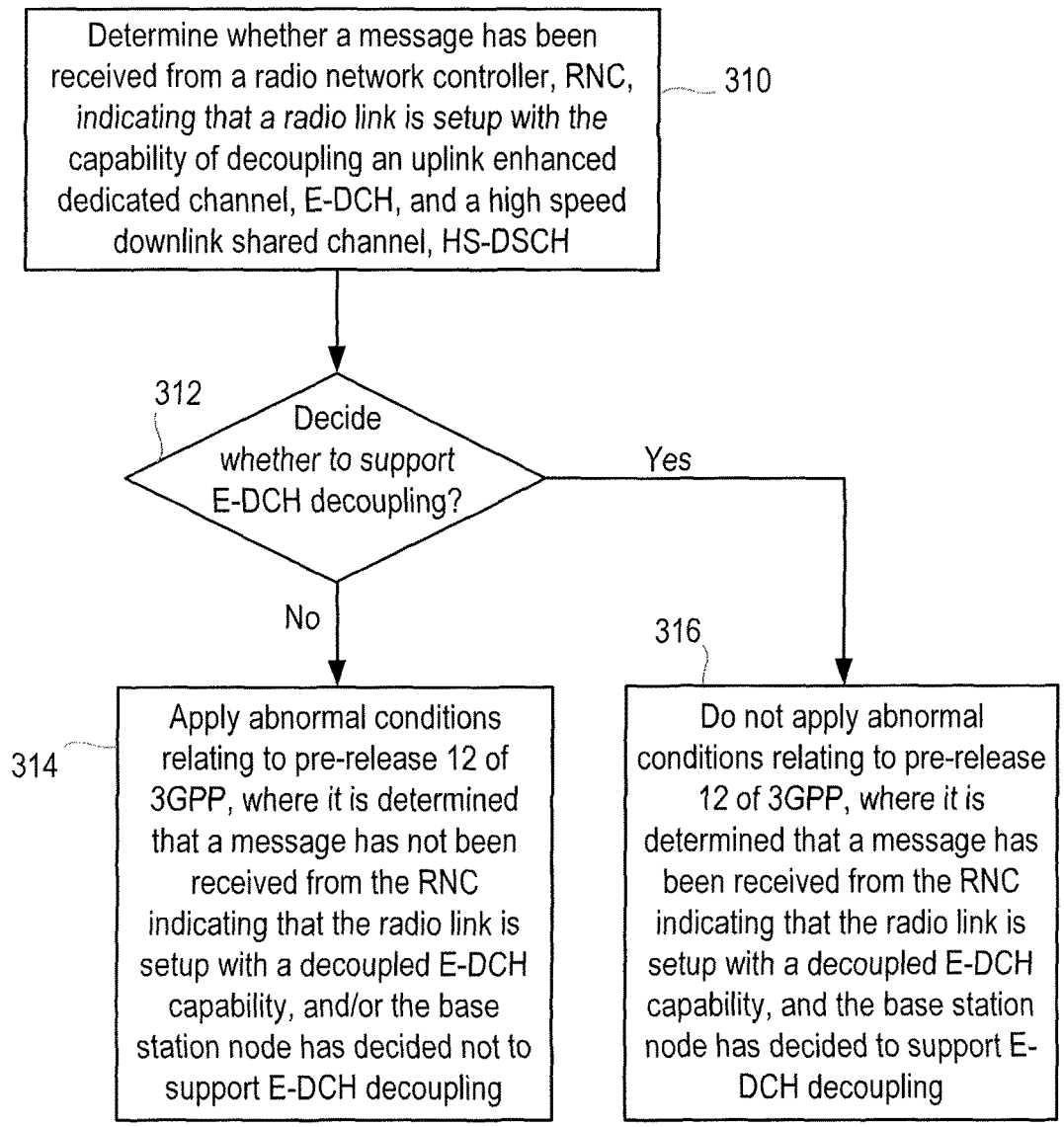
FIG. 3*b* illustrates a method according to another embodiment.

FIG. 3b shows a method in a base station node according to another embodiment, for decoupling an uplink enhanced dedicated channel, E-DCH, and a high speed downlink shared channel, HS-DSCH. The method comprises determining whether a message has been received from a radio network controller, RNC, indicating that a radio link is setup with the capability of decoupling an E-DCH and a HS-DSCH, step 310. In step 312, it is decided whether to support E-DCH decoupling. Where it is determined that a message has not been received from the RNC indicating that the radio link is setup with a decoupled E-DCH capability, and/or the base station node has decided not to support E-DCH decoupling, in step 314 the method comprises applying abnormal conditions relating to pre-release 12 of 3GPP, i.e. applying pre Rel-12 Abnormal Conditions. Where it is determined that a message has been received from the RNC indicating that the radio link is setup with a decoupled E-DCH capability, and the base station node has decided to support E-DCH decoupling, the method comprises in step 316 not applying abnormal conditions relating to pre-release 12 of 3GPP, i.e. not applying pre Rel-12 Abnormal Conditions.

In one example the step of deciding whether or not to support E-DCH decoupling is based on whether the base station node is capable of supporting decoupling of an E-DCH and a HS-DSCH. In another example, the step of deciding whether or not to support E-DCH decoupling is based on whether the base station node is capable of supporting decoupling of an E-DCH and a HS-DSCH, and if so, whether the base station node wishes to provide decoupling for that particular radio link based on some other criteria.

Although FIGS. 2a to 2c and 3a to 3b are described as relating to alternative methods for decoupling an E-DCH cell and a HS-DSCH cell from each other, it is possible to combine the solutions proposed in any of FIGS. 2a to 2c and 3a to 3b. In such an embodiment, an explicit indication may be sent from a Node B or DRNC to a RNC to state that it supports the decoupled E-DCH. Additionally, the E-DCH decoupling indication may be sent from a RNC to a Node B or DRNC to indicate the E-DCH is decoupled from HS-DSCH.

Figure 4:
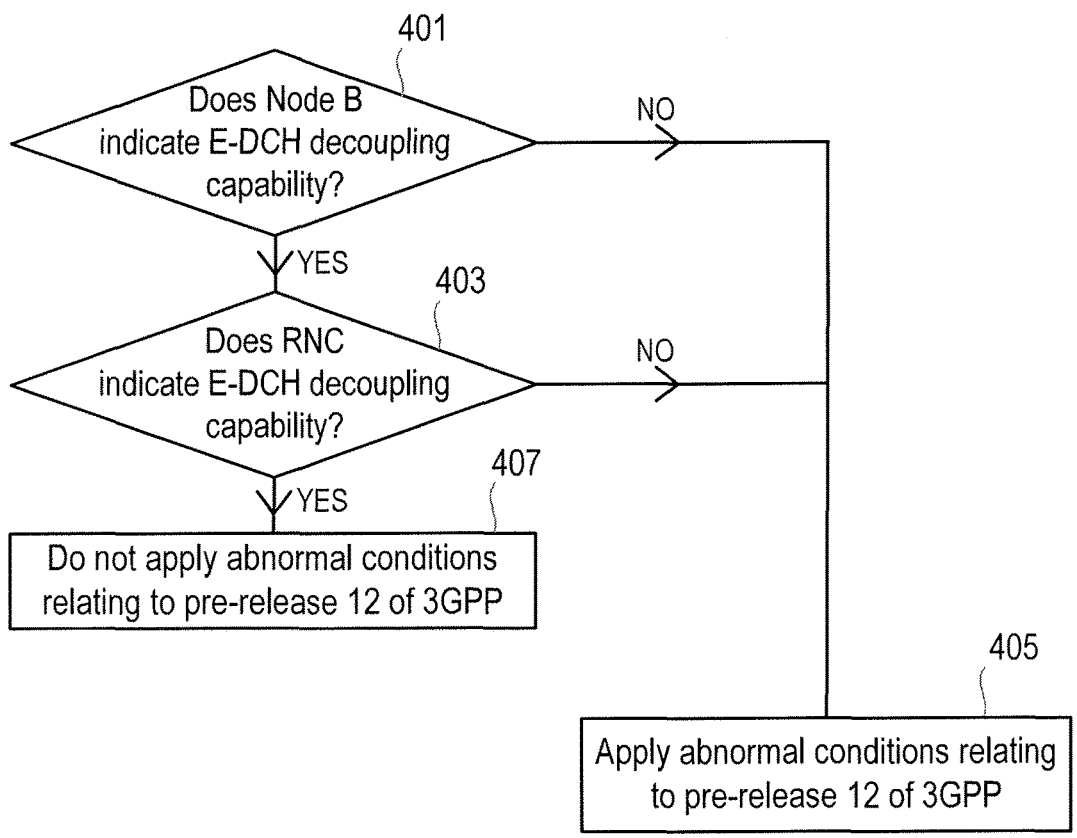
FIG. 4 illustrates a method according to another embodiment.

FIG. 4 shows an example of a method according to a combined embodiment. In step 401 it is determined whether a Node B indicates E-DCH decoupling capability. If not, the method comprises the step of applying abnormal conditions relating to pre-release 12 of 3GPP, i.e. applying pre-Rel 12 Abnormal Conditions, step 405. If it is determined in step 401 that the Node B does indicate E-DCH decoupling capability, it is determined in step 403 if the RNC indicates E-DCH decoupling capability. If not, the method comprises the step of applying abnormal conditions relating to pre-release 12 of 3GPP, i.e. applying pre-Rel 12 Abnormal Conditions, step 405. If it is determined in step 403 that the RNC does indicate E-DCH decoupling capability, the method comprises the step of not applying abnormal conditions relating to pre-release 12 of 3GPP, i.e. not applying pre-Rel 12 Abnormal Conditions, step 407. It is noted that in the embodiment above, steps 401 and 403 may be performed in any order.

In particular embodiments that combine the methods of FIGS. 2a to 2c and 3a to 3b, for example an embodiment that performs the steps of FIG. 4 above, the Abnormal Conditions in NBAP/RNSAP specification in Radio Link Setup, Radio Link Addition, Radio Link Reconfiguration procedures may be modified to state if the RNC does not indicate E-DCH decoupling or if Node B does not indicate its E-DCH decoupling support, then the existing abnormal condition is valid. Table 3 below is an extract from TS 25.433 (v. 12 • 0 • 0)/8.2.17.4 Abnormal Conditions and demonstrates proposed alternative language for such an embodiment:

TABLE 3

| | Current Text | Modified Text Example |
| --- | --- | --- |
| 8.2.17.4 Abnormal Conditions | If the RADIO LINK SETUP REQUEST message contains the HS-PDSCH RL ID IE and the Serving E-DCH RL IE but the Serving HS-DSCH Radio Link and the Serving E-DCH Radio Link are not configured to be in the same cell then the Node B shall reject the procedure using the RADIO LINK SETUP FAILURE message. | If the Node B does not indicate "E-DCH decoupling Capable", and if the RADIO LINK SETUP REQUEST message does not contain E-DCH decoupling Request IE and contains the HS-PDSCH RL ID IE and the Serving E-DCH RL IE but the Serving HS-DSCH Radio Link and the Serving E-DCH Radio Link are not configured to be in the same cell then the Node B shall reject the procedure using the RADIO LINK SETUP FAILURE message. |

This alternative provides flexibility in a RNC and a Node B or DRNC.

Although the examples described in Tables 1, 2a, 2b and 3 are made in the context of Radio Link Setup Request procedures and messages, and the Abnormal Conditions according to section 8.2.17.4 of TS 25.433, v.12.0.0 or later, it is noted that the embodiments may also be applied to the Radio Link Addition Request procedures and message, and the corresponding Abnormal Conditions according to section 8.3.1.4 of TS 25.433, v.12.0.0 or later. In such an example the Abnormal Conditions may be adapted as follows:

If the RADIO LINK ADDITION REQUEST message does not contain the E-DCH Decoupling Indication IE but contains the HS-PDSCH RL ID IE [FDD—in the HS-DSCH Serving Cell Change Information IE] and/or Serving E-DCH RL IE, and if both HS-DSCH and E-DCH are configured in the Node B but the Serving HS-DSCH Radio Link and the Serving E-DCH Radio Link are not in the same cell, then the Node B shall reject the procedure using the RADIO LINK ADDITION FAILURE message.

It is noted that the embodiments may also be applied to the Radio Link Reconfiguration Prepare procedures and message, and the corresponding Abnormal Conditions according to section 8.3.2.4 of TS 25.433, v.12.0.0 or later. In such an example the Abnormal Conditions may be adapted as follows:

If the RADIO LINK RECONFIGURATION PREPARE message does not contain the E-DCH Decoupling Indication IE but contains the HS-PDSCH RL ID IE and/or the Serving E-DCH RL IE, and if both HS-DSCH and E-DCH are configured in the new configuration but the Serving HS-DSCH Radio Link and the Serving E-DCH Radio Link are not in the same cell, then the Node B shall reject the procedure using the RADIO LINK RECONFIGURATION FAILURE message.

It is noted that the embodiments may also be applied to the Radio Link Reconfiguration Request procedures and message, and the corresponding Abnormal Conditions according to section 8.3.5.4 of TS 25.433, v.12.0.0 or later. In such an example the Abnormal Conditions may be adapted as follows:

If the RADIO LINK RECONFIGURATION REQUEST message does not contain the E-DCH Decoupling Indication IE but contains the HS-PDSCH RL ID IE and/or the Serving E-DCH RL IE, and if both HS-DSCH and E-DCH are configured in the new configuration but the Serving HS-DSCH Radio Link and the Serving E-DCH Radio Link are not in the same cell, then the Node B shall reject the procedure using the RADIO LINK RECONFIGURATION FAILURE message.

According to another embodiment, there is provided a method comprising the steps of inserting an information element into a radio link message, the information element comprising an indication that an uplink enhanced dedicated channel, E-DCH, may be decoupled from a high speed downlink shared channel, HS-DSCH. The information element may be inserted in one or more of a radio link setup request message, a radio link addition request message, a radio link reconfiguration prepare message or a radio link reconfiguration request message.

As described with respect to FIG. 1 above, embodiments of network 100 may include one or more wireless devices 110, and one or more different types of network nodes capable of communicating (directly or indirectly) with wireless devices 110. Examples of the network nodes include radio network nodes 115, 120, and core network nodes 130. The network may also include any additional elements suitable to support communication between wireless devices 110 or between a wireless device 110 and another communication device (such as a landline telephone).

Wireless device 110, radio network node 115, and core network node 130 may use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies, such as WCDMA. However, the scope of the disclosure is not limited to the examples and other embodiments could use different radio access technologies.

Each of wireless device 110, radio network node 115, radio network controller 120, and core network node 130 may include any suitable combination of hardware and/or software. Examples of particular embodiments of a radio network node 115, for example a radio base station, and network nodes (such as radio network controller 120 or core network node 130) are described with respect to FIGS. 5 and 6 below, respectively.

Figure 5:
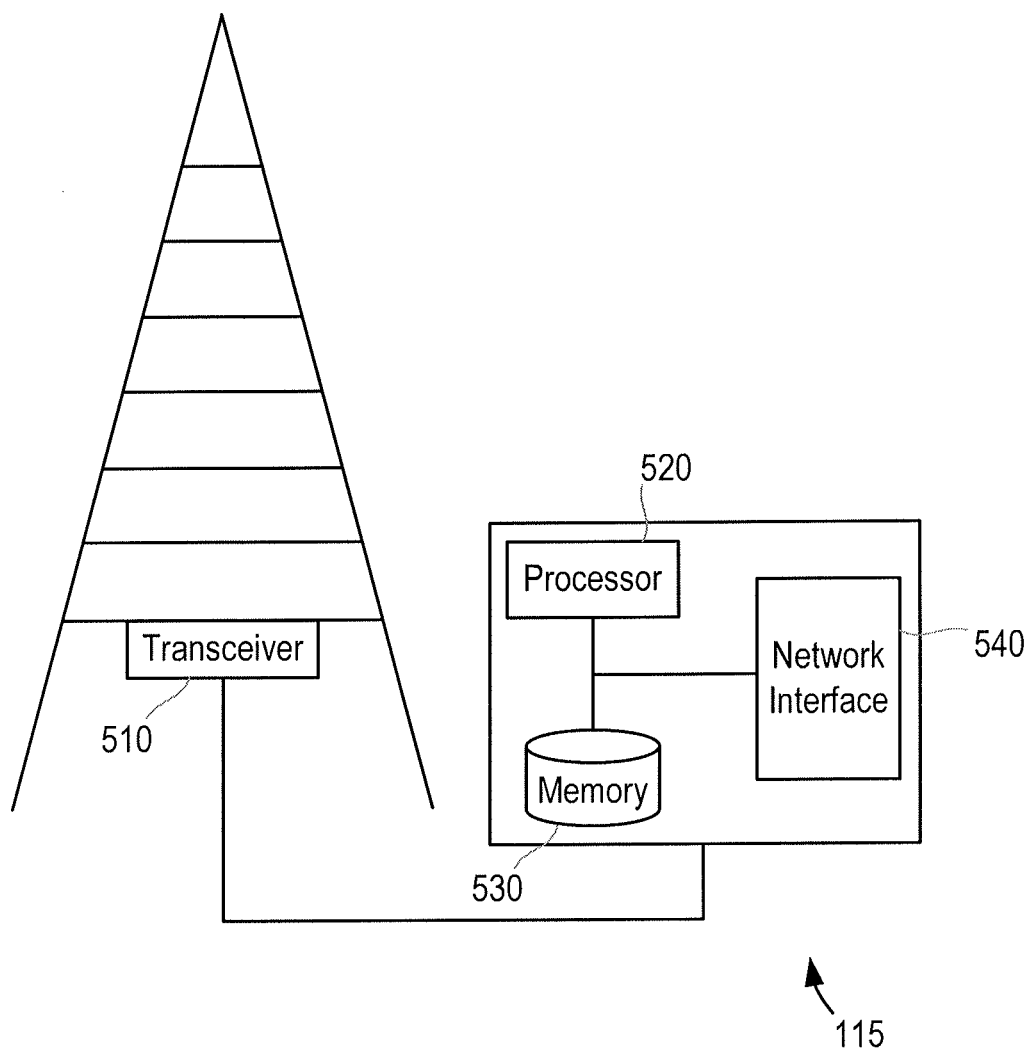
FIG. 5 is a block diagram illustrating certain embodiments of a radio network node.

FIG. 5 is a block diagram illustrating certain embodiments of a radio network node 115. Examples of radio network node 115 include an eNodeB, a node B, a base station node, a wireless access point (e.g., a Wi-Fi access point), a low power node, a base transceiver station (BTS), transmission points, transmission nodes, remote RF unit (RRU), remote radio head (RRH), a drifting radio network controller (DRNC) etc. Radio network nodes 115 may be deployed throughout network 100 as a homogenous deployment, heterogeneous deployment, or mixed deployment. A homogenous deployment may generally describe a deployment made up of the same (or similar) type of radio network nodes 115 and/or similar coverage and cell sizes and inter-site distances. A heterogeneous deployment may generally describe deployments using a variety of types of radio network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Radio network node 115 may include one or more of transceiver 510, processor 520, memory 530, and network interface 540. In some embodiments, transceiver 510 facilitates transmitting wireless signals to and receiving wireless signals from wireless device 510 (e.g. via an antenna), processor 520 executes instructions to provide some or all of the functionality described above as being provided by a radio network node 115, memory 530 stores the instructions executed by processor 520, and network interface 540 communicates signals to backend network components, such as a gateway, switch, router, Internet, Public Switched Telephone Network (PSTN) I core network nodes 130, radio network controllers 120, etc.

Processor 520 may include any suitable combination of hardware and software implemented in one or more modules to execute instructions and manipulate data to perform some or all of the described functions of radio network node 115. In some embodiments, processor 520 may include, for example, one or more computers, one or more central processing units (CPUs), one or more microprocessors, one or more applications, and/or other logic.

Memory 530 is generally operable to store instructions, such as a computer program, software, an application including one or more of logic, rules, algorithms, code, tables, etc. and/or other instructions capable of being executed by a processor. Examples of memory 530 include computer memory (for example, Random Access Memory (RAM) • or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 540 is communicatively coupled to processor 520 and may refer to any suitable device operable to receive input for radio network node 115, send output from radio network node 115, perform suitable processing of the input or output or both, communicate to other devices, or any combination of the preceding. Network interface 540 may include appropriate hardware (e.g., port, modem, network interface card, etc.) and software, including protocol conversion and data processing capabilities, to communicate through a network.

Other embodiments of radio network node 115 may include additional components beyond those shown in FIG. 5 that may be responsible for providing certain aspects of the radio network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

According to one embodiment there is provided a radio network node 115, for example a base station or Node B or DRNC, for decoupling an uplink enhanced dedicated channel, E-DCH, and a high speed downlink shared channel, HS-DSCH. The radio network node 115 comprises a network interface 540 adapted to interface with a radio network, a memory unit 530, and a processor unit 520 adapted to run program instructions stored on the memory unit 530. The processor unit 520 is adapted to determine whether a radio link message received from a radio network controller, RNC, contains an indication that a radio link procedure has the capability of decoupling an E-DCH and a HS-DSCH. Where it is determined that the radio link message does not contain an E-DCH indication, the processor unit 520 is further adapted to reject the radio link procedure in the event that a serving E-DCH radio link and a serving HS-DSCH radio link are not configured in the same cell.

In one example, where it is determined that the radio link message does contain an E-DCH indication, the processor unit 520 may be further adapted to not reject the radio link procedure in the event that a serving E-DCH radio link and a serving HS-DSCH radio link are not configured in the same cell.

According to some embodiments a radio link procedure may comprise a radio link setup request procedure, a radio link addition request procedure, a radio link reconfiguration prepare procedure or a radio link reconfiguration request procedure.

According to some embodiments a radio link message may comprise a radio link setup request message, a radio link addition request message, a radio link reconfiguration prepare message or a radio link reconfiguration request message.

Figure 6:
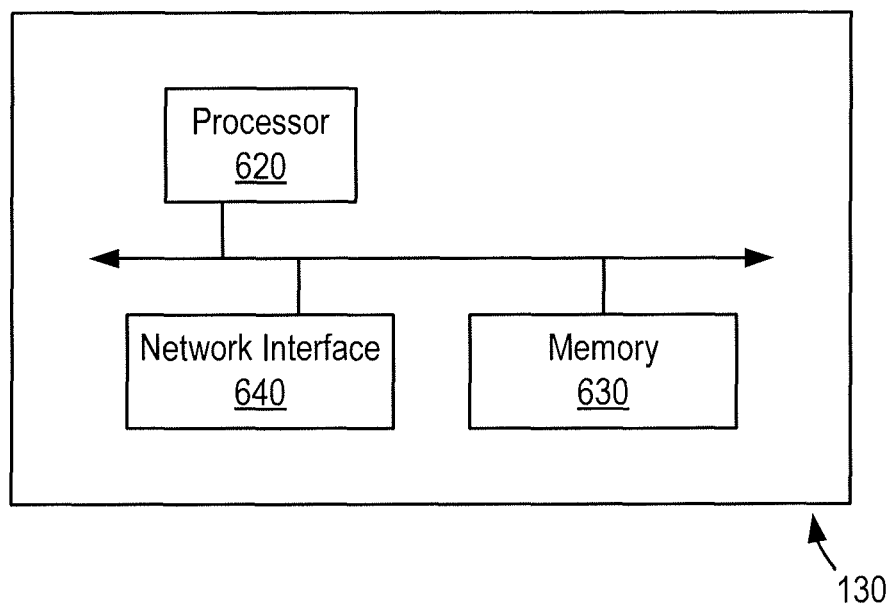
FIG. 6 is a block diagram illustrating certain embodiments of another radio network node.

FIG. 6 is a block diagram illustrating certain embodiments of a radio network controller 120 or core network node 130. Examples of network nodes can include a mobile switching center (MSC), a serving GPRS support node (SGSN), a mobility management entity (MME), a radio network controller (RNC), a base station controller (BSC), and so on. The network node includes processor 620, memory 630, and network interface 640. In some embodiments, processor 620 executes instructions to provide some or all of the functionality described above as being provided by the network node, memory 630 stores the instructions executed by processor 620, and network interface 640 communicates signals to a suitable node, such as a gateway, switch, router, Internet, Public Switched Telephone Network (PSTN), radio network nodes 115, radio network controllers 120, core network nodes 130, etc.

Processor 620 may include any suitable combination of hardware and software implemented in one or more modules to execute instructions and manipulate data to perform some or all of the described functions of the network node. In some embodiments, processor 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processor 620 and may refer to any suitable device operable to receive input for the network node, send output from the network node, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

According to one embodiment, there is provided a radio network controller, RNC, node 120 for decoupling an uplink enhanced dedicated channel, E-DCH, and a high speed downlink shared channel, HS-DSCH. The radio network controller node 120 comprises a network interface 640 adapted to interface with a radio network, a memory unit 630, and a processor unit 620 adapted to run program instructions stored on the memory unit. The processor unit 620 is adapted to determine whether a received radio link message contains a E-DCH decoupling indication, indicating that a base station node supports decoupling of an E-DCH and a high speed downlink shared channel. Where it is determined that the E-DCH decoupling indication has not been received, the processor unit 620 is further adapted to control the base station node to reject the radio link procedure in the event that a serving E-DCH radio link and a serving HS-DSCH radio link are not configured in the same cell.

In one example, where it is determined that the E-DCH decoupling indication has been received, the processor unit 620 may be further adapted to control the base station node to not reject the radio link procedure in the event that a serving E-DCH radio link and a serving HS-DSCH radio link are not configured in the same cell.

According to some embodiments a radio link procedure may comprise a radio link setup request procedure, a radio link addition request procedure, a radio link reconfiguration prepare procedure or a radio link reconfiguration request procedure.

According to some embodiments a radio link message may comprise a radio link setup request message, a radio link addition request message, a radio link reconfiguration prepare message or a radio link reconfiguration request message.

Other embodiments of the network node may include additional components beyond those shown in FIG. 6 that may be responsible for providing certain aspects of the network node's functionality, including any of the functionality described above and/or any additional functionality (including any functionality necessary to support the solution described above).

Summary of Example Implementation

From the above it can be seen that, in particular example implementations, the proposed solutions may provide methods for decoupling an E-DCH cell and a HS-DSCH cell that solves the backwards not compatible problem. In one example embodiment, the method may include:

Determining whether a radio link message contains a E-DCH decoupling indication, and where it is determined that the radio link message does not contain an E-DCH decoupling indication, a base station node is controlled to reject a radio link procedure in the event that a serving E-DCH radio link and a serving HS-DSCH radio link are not configured in the same cell.

Where it is determined that the radio link message does contain an E-DCH decoupling indication, a base station node is controlled such that it does not reject a radio link procedure in the event that a serving E-DCH radio link and a serving HS-DSCH radio link are not configured in the same cell.

In another embodiment, the method comprises determining whether an RNC has received an indication stating that a Node B or DRNC supports EDCH decoupling;

Applying pre Rel-12 Abnormal Conditions, where it is determined that the indication has not been received from the Node B or DRNC; and Not applying pre Rel-12 Abnormal Conditions, where it is determined that the indication has been received from the Node B or DRNC.

Optionally, the indication from Node B may be set on Cell bases and be included in Audit and Resource Status Indication procedure.

Optionally, the indication from Node B may be added to existing Node B Cell Capability Container, which is sent in AUDIT.

In another example embodiment, the method may include:

Determining whether an RNC has transmitted a message to the Node B or DRNC indicating that the radio link is setup with decoupled E-DCH and the Node B or DRNC has accepted to support E-DCH decoupling;

Applying pre Rel-12 Abnormal Conditions, where it is determined that the RNC has not transmitted the message to the Node B or DRNC indicating that the radio link is setup with decoupled E-DCH and/or the Node B or DRNC has not accepted to support E-DCH decoupling; and Not applying pre Rel-12 Abnormal Conditions, where it is determined that RNC has transmitted the message and the Node B or DRNC has accepted to support E-DCH decoupling.

In still another example embodiment, the method may include:

Determining whether 1) an RNC has transmitted a message to the Node B or DRNC indicating that the radio link is setup with decoupled E-DCH and 2) the Node B or DRNC has transmitted an indication stating that the Node B or DRNC supports E-DCH decoupling;

Applying pre Rel-12 Abnormal Conditions, where it is determined that the RNC has not transmitted the message to the Node B or DRNC and that the Node B or DRNC has not transmitted the message indicating that it supports E-DCH decoupling; and Not applying pre Rel-12 Abnormal Conditions, where it is determined that the RNC has transmitted the message to the Node B or DRNC and that the Node B or DRNC has transmitted the message indicating that it supports E-DCH decoupling.

Other implementations may include a wireless communication device and/or access node configured to implement the described method, or a wireless communication system in which a wireless communication device and/or access node implement the described method.

Some embodiments of the disclosure may provide one or more technical advantages. For example, in certain embodiments, decoupling of the serving E-DCH cell and the serving HS-DSCH cell may be allowed for the improved performance in the presence of imbalance between the uplink and the downlink. Accordingly, a technical advantage may be the decoupling of the serving E-DCH cell and the serving HSDSCH cell in heterogeneous network environments. Another technical advantage may be that the Node B or DRNC will not reject the decoupling procedure even where the HS-DSCH and the E-DCH are not the same cell. Still another advantage may be that the backwards not compatible problem may be alleviated.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Although the embodiments described above are made in the context of Abnormal Conditions for a Radio Link Setup procedure, it is noted that the method may also be used of other radio link procedures, such as radio link addition, radio link reconfiguration, as shown in the examples above.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a network node for decoupling an uplink enhanced dedicated channel, E-DCH, and a high speed downlink shared channel, HS-DSCH, the method comprising:
   determining whether a radio link message contains a E-DCH decoupling indication and
   where it is determined that the radio link message does not contain an E-DCH decoupling indication, controlling a base station node to reject a radio link procedure in the event that a serving E-DCH radio link and a serving HS-DSCH radio link are not configured in the same cell.

2. A method as claimed in claim 1, comprising:
   where it is determined that the radio link message does contain an E-DCH decoupling indication, controlling a base station node such that it does not reject a radio link procedure in the event that a serving E-DCH radio link and a serving HS-DSCH radio link are not configured in the same cell.

3. A method as claimed in claim 1, wherein the E-DCH decoupling indication is provided in an information element of the radio link message.

4. A method as claimed in claim 1, wherein the E-DCH decoupling indication is set on a per cell basis.

5. A method as claimed in claim 1, wherein the E-DCH decoupling indication is included in an audit and resource status indication procedure.

6. A method as claimed in claim 1, wherein the E-DCH decoupling indication is added to a cell capability container.

7. A method as claimed in claim 1, wherein the base station node comprises a Node B or a drifting radio network controller, DRNC, node.

8. A method as claimed in claim 1, wherein:
   a radio link procedure comprises a radio link setup request procedure, a radio link addition request procedure, a radio link reconfiguration prepare procedure or a radio link reconfiguration request procedure; and/or
   a radio link message comprises a radio link setup request message, a radio link addition request message, a radio link reconfiguration prepare message or a radio link reconfiguration request message.

9. A method as claimed in claim 8, wherein the method comprises performing abnormal conditions relating to one or more of sections 8.2.17.4 or 8.3.1.4 or 8.3.2.4 or 8.3.5.4 of the third generation partnership project, 3GPP, technical specification 25.433 version 12.0.0 or later.

10. A method as claimed in claim 1, wherein the network node comprises a radio network controller, RNC, node.

11. A method as claimed in claim 10, wherein the E-DCH decoupling indication is received from a base station node.

12. A method as claimed in claim 1, wherein the network node comprises the base station node.

13. A method as claimed in claim 12, wherein the E-DCH decoupling indication is received from a radio network controller, RNC node.

14. A method as claimed in claim 12, wherein the base station node further comprises the step of deciding whether or not to support E-DCH decoupling.

15. A method as claimed in claim 14, wherein the step of deciding whether or not to support E-DCH decoupling is based on one or more of:
   whether the base station node is capable of supporting decoupling of an E-DCH and a HS-DSCH; or
   whether the base station node is capable of supporting decoupling of an E-DCH and a HS-DSCH, and if so, whether the base station node wishes to provide decoupling for that particular radio link based on some other criteria;
   whether the base station node is capable of supporting decoupling of an E-DCH and a HS-DSCH, and if so, whether the base station node has capacity to support E-DCH decoupling.

16. A radio network node for decoupling an uplink enhanced dedicated channel, E-DCH, and a high speed downlink shared channel, HS-DSCH, the radio network node comprising:
   a network interface adapted to interface with a radio network;
   a memory unit;
   a processor unit adapted to run program instructions stored on the memory unit;
   wherein the processor unit is adapted to determine whether a radio link message received from a radio network controller, RNC, contains an indication that a radio link procedure has the capability of decoupling an E-DCH and a HS-DSCH; and,
   where it is determined that the radio link message does not contain an E-DCH indication, the processor unit is further adapted to reject the radio link procedure in the event that a serving E-DCH radio link and a serving HS-DSCH radio link are not configured in the same cell.

17. A radio network node as claimed in claim 16 whereby, where it is determined that the radio link message does contain an E-DCH indication, the processor unit is further adapted to not reject the radio link procedure in the event that a serving E-DCH radio link and a serving HS-DSCH radio link are not configured in the same cell.

18. A radio network controller, RNC, node for decoupling an uplink enhanced dedicated channel, E-DCH, and a high speed downlink shared channel, HS-DSCH, the radio network controller node comprising:
   a network interface adapted to interface with a radio network;
   a memory unit;
   a processor unit adapted to run program instructions stored on the memory unit;
   wherein the processor unit is adapted to determine whether a received radio link message contains a E-DCH decoupling indication, indicating that a base station node supports decoupling of an E-DCH and a high speed downlink shared channel, HS-DSCH; and
   where it is determined that the E-DCH decoupling indication has not been received, the processor unit is further adapted to control the base station node to reject the radio link procedure in the event that a serving E-DCH radio link and a serving HS-DSCH radio link are not configured in the same cell.

19. A radio network controller, RNC, node as claimed in claim 18 wherein, where it is determined that the E-DCH decoupling indication has been received, the processor unit (620) is further adapted to control the base station node to not reject the radio link procedure in the event that a serving E-DCH radio link and a serving HS-DSCH radio link are not configured in the same cell.

20. A method comprising the steps of inserting an information element into a radio link message, the information element comprising an indication that an uplink enhanced dedicated channel, E-DCH, may be decoupled from a high speed downlink shared channel, HS-DSCH.

21. A method as claimed in claim 20, wherein the information element is inserted in one or more of a radio link setup request message, a radio link addition request message, a radio link reconfiguration prepare message or a radio link reconfiguration request message.

* * * * *

UNITED STATES PATENT AND TRADEMARK OFFICE
CERTIFICATE OF CORRECTION

| | | |
|---|---|---|
| PATENT NO. | : 9,635,704 B2 | |
| APPLICATION NO. | : 14/772195 | |
| DATED | : April 25, 2017 | |
| INVENTOR(S) | : Shi et al. | |

It is certified that error appears in the above-identified patent and that said Letters Patent is hereby corrected as shown below:

In the Specification

In Column 1, Line 50, delete "(NABP)" and insert -- (NBAP) --, therefor.

In Column 2, Line 8, delete "NABP" and insert -- NBAP --, therefor.

In Column 3, Line 10, delete "EDCH" and insert -- E-DCH --, therefor.

In Column 3, Line 67, delete "HSDSCH" and insert -- HS-DSCH --, therefor.

In Column 5, Line 58, delete "comprises" and insert -- comprise --, therefor.

In Column 6, Line 5, delete "RNC" and insert -- RNC, --, therefor.

In Column 7, Line 66, delete "EDCH" and insert -- E-DCH --, therefor.

In Column 8, in Table 2b, under "Modified Text Example", Line 7, delete "but the" and insert -- the --, therefor.

In Column 12, Line 11, delete "below," and insert -- below --, therefor.

In Column 12, Line 17, delete "RF" and insert -- radio --, therefor.

In Column 12, Line 37, delete "device 510" and insert -- device 110 --, therefor.

In Column 15, Line 31, delete "EDCH" and insert -- E-DCH --, therefor.

In Column 16, Line 22, delete "HSDCH" and insert -- HS-DCH --, therefor.

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,635,704 B2

In the Claims

In Column 17, Line 10, in Claim 1, delete "indication and" and insert -- indication; and --, therefor.

In Column 17, Line 59, in Claim 13, delete "RNC" and insert -- RNC, --, therefor.

In Column 18, Lines 58-59, in Claim 19, delete "unit (620)" and insert -- unit --, therefor.